United States Patent [19]

Minakuti et al.

[11] Patent Number: 5,461,439
[45] Date of Patent: Oct. 24, 1995

[54] CAMERA AND PRINTER FOR PRODUCING PRINT FROM A FILM EXPOSED THEREIN THE CAMERA

[75] Inventors: Jun Minakuti, Amagasaki; Takehiro Katoh, Nara; Yoshinobu Kudo, Osaka; Hiroshi Ootsuka, Sakai, all of Japan

[73] Assignee: Minolta Camera Kabushiki Kaisha, Osaka, Japan

[21] Appl. No.: 69,782

[22] Filed: Jun. 1, 1993

[30] Foreign Application Priority Data

Jun. 1, 1992 [JP] Japan .................................. 4-166957

[51] Int. Cl.⁶ .............................. G03B 17/24; G03B 7/08
[52] U.S. Cl. ......................... 354/106; 354/109; 354/430
[58] Field of Search ................................. 354/105, 106, 354/429, 430, 432, 109

[56] References Cited

U.S. PATENT DOCUMENTS

| | | | |
|---|---|---|---|
| 4,079,388 | 3/1978 | Takahama et al. | 354/31 |
| 4,511,229 | 4/1985 | Schawartz et al. | 354/20 |
| 4,574,319 | 3/1986 | Konishi | 358/335 |
| 5,016,039 | 5/1991 | Sosa et al. | 354/430 |
| 5,023,656 | 6/1991 | Terashita | 355/41 |
| 5,128,708 | 7/1992 | Murayama et al. | 354/430 |
| 5,128,711 | 7/1992 | Terashita et al. | 355/41 |

FOREIGN PATENT DOCUMENTS

| | | |
|---|---|---|
| 59-162532 | 9/1984 | Japan . |
| 2-64532 | 3/1990 | Japan . |
| 3-45945 | 2/1991 | Japan . |
| 3-51839 | 3/1991 | Japan . |

*Primary Examiner*—Michael L. Gellner
*Assistant Examiner*—Nicholas J. Tuccillo
*Attorney, Agent, or Firm*—Burns, Doane, Swecker & Mathis

[57] ABSTRACT

A camera records instructions for printing at the time of photographing, and a printer for producing a print from the film reads the instructions recorded on the film and calculates an appropriate exposure amount for the printing operation. The instructions are photographic magnification of a main object, information concerning flash photography, a position of a main object and the like.

13 Claims, 15 Drawing Sheets

( ): A VARIABLE REPRESENTATIVE OF LIGHT MEASUREMENT VALUE ( ): A VARIABLE REPRESENTATIVE OF
LIGHT MEASUREMENT VALUE

Fig. 12(a)

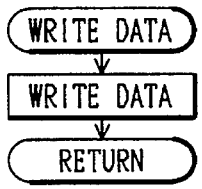

Fig. 12(b)

DATA CONTENTS

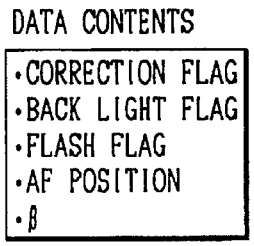
- CORRECTION FLAG
- BACK LIGHT FLAG
- FLASH FLAG
- AF POSITION
- $\beta$

Fig. 12(c)

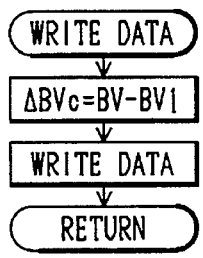

Fig. 12(d)

DATA CONTENTS

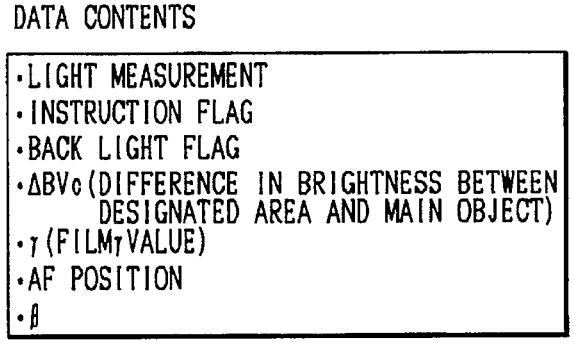
- LIGHT MEASUREMENT
- INSTRUCTION FLAG
- BACK LIGHT FLAG
- $\Delta BV_C$ (DIFFERENCE IN BRIGHTNESS BETWEEN DESIGNATED AREA AND MAIN OBJECT)
- $\gamma$ (FILM $\gamma$ VALUE)
- AF POSITION
- $\beta$

Fig. 12(e)

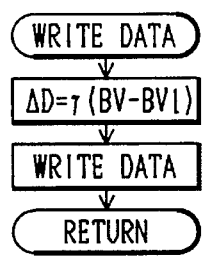

Fig. 12(f)

DATA CONTENTS

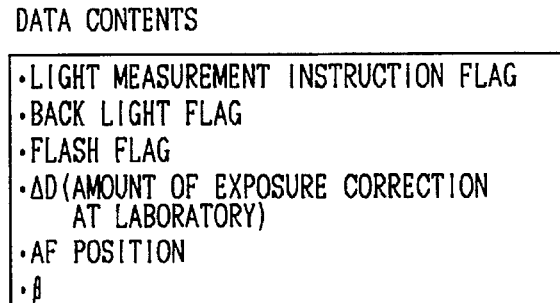
- LIGHT MEASUREMENT INSTRUCTION FLAG
- BACK LIGHT FLAG
- FLASH FLAG
- $\Delta D$ (AMOUNT OF EXPOSURE CORRECTION AT LABORATORY)
- AF POSITION
- $\beta$

Fig. 13

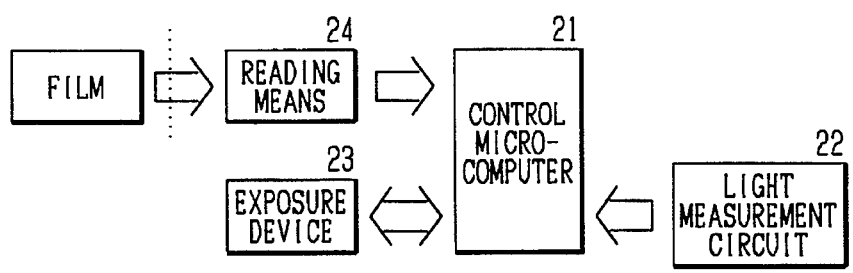

CAMERA AND PRINTER FOR PRODUCING PRINT FROM A FILM EXPOSED THEREIN THE CAMERA

BACKGROUND OF THE INVENTION

1. Field of the Invention

The present invention relates to a camera and a printer for producing a photographic print from a film exposed in the camera, and more particularly to a technique for determining an exposure amount at the time of printing.

2. Related Background Arts

Conventionally, in a photographic system employing the negative-positive method, an exposure for a negative photosensitive material (film) is determined on the side of camera, while an exposure for a positive photosensitive material (printing paper) is determined through an independent algorithm by light measurement of the negative film on the printer side in a laboratory. That is, these two exposure determinations are carried out separately and irrespectively from one another.

Specifically, there are disclosed photographic printing methods as follows; Japanese Laid-Open Patent Publication No. 2-278249, wherein strobe light emission data is recorded onto a film at the time of photographing and then, at the time of printing, the data is read out for classifying scenes so that exposure amount is computed by exposure calculation suitable for each scene; Japanese Laid-Open Patent Publication No. 3-41433, wherein object distance data is recorded onto a film at the time of photographing and then, at the time of printing, after performing light measurement at plural points in an image frame, and removing unnecessary measurement points in consideration of the above distance data, a printing exposure amount is obtained based on the measurement value; Japanese Laid-Open Patent Publication No. 3-51839 which describes a camera provided with means for recording data representing a position of main object in an image frame and a photographic printer which determines a printing exposure amount based on the data recorded on the film; Japanese Laid-Open Patent Publication No. 3-95542, wherein data on a distance measuring area including a main object is recorded onto a film at the time of photographing, and then, at the time of printing, a range of the main area is determined by reading the distance measuring area data and exposure is controlled based on the data within the range.

However, in the conventional cameras and printers, in spite of the camera exposing a main object with sufficiently high accuracy, light measurement is carried out on laboratory side before the printing operation, for determining an exposure amount at the time of printing. Accordingly, if the light measurement is imperfect, sometimes pictures which are under or over exposed are produced.

SUMMARY OF THE INVENTION

The present invention has been made to solve the above described problem. It is therefore an object of the present invention to provide a camera capable of recording instructions for a printer so as to produce a photographic print in accordance with photographing information.

The other object of the present invention to provide a printer capable of printing a film with an appropriate exposure in a laboratory, by using information recorded on a film by the camera.

BRIEF DESCRIPTION OF THE DRAWINGS

FIG. 12(*a*) is a flow chart showing data writing processing.

FIG. 12(*b*) is a view showing contents of the data.

FIG. 12(*c*) is a flowchart showing the processing according to the first modification.

FIG. 12(*d*) is a view showing contents of data.

FIG. 12(*e*) of is a flowchart showing the processing according to the second modification.

FIG. 12(*f*) is a view showing contents of the data.

FIG. 13 is a view showing construction of a printer on laboratory side according to an embodiment of the present invention.

DETAILED DESCRIPTION OF THE PREFERRED EMBODIMENTS

Figure 1:
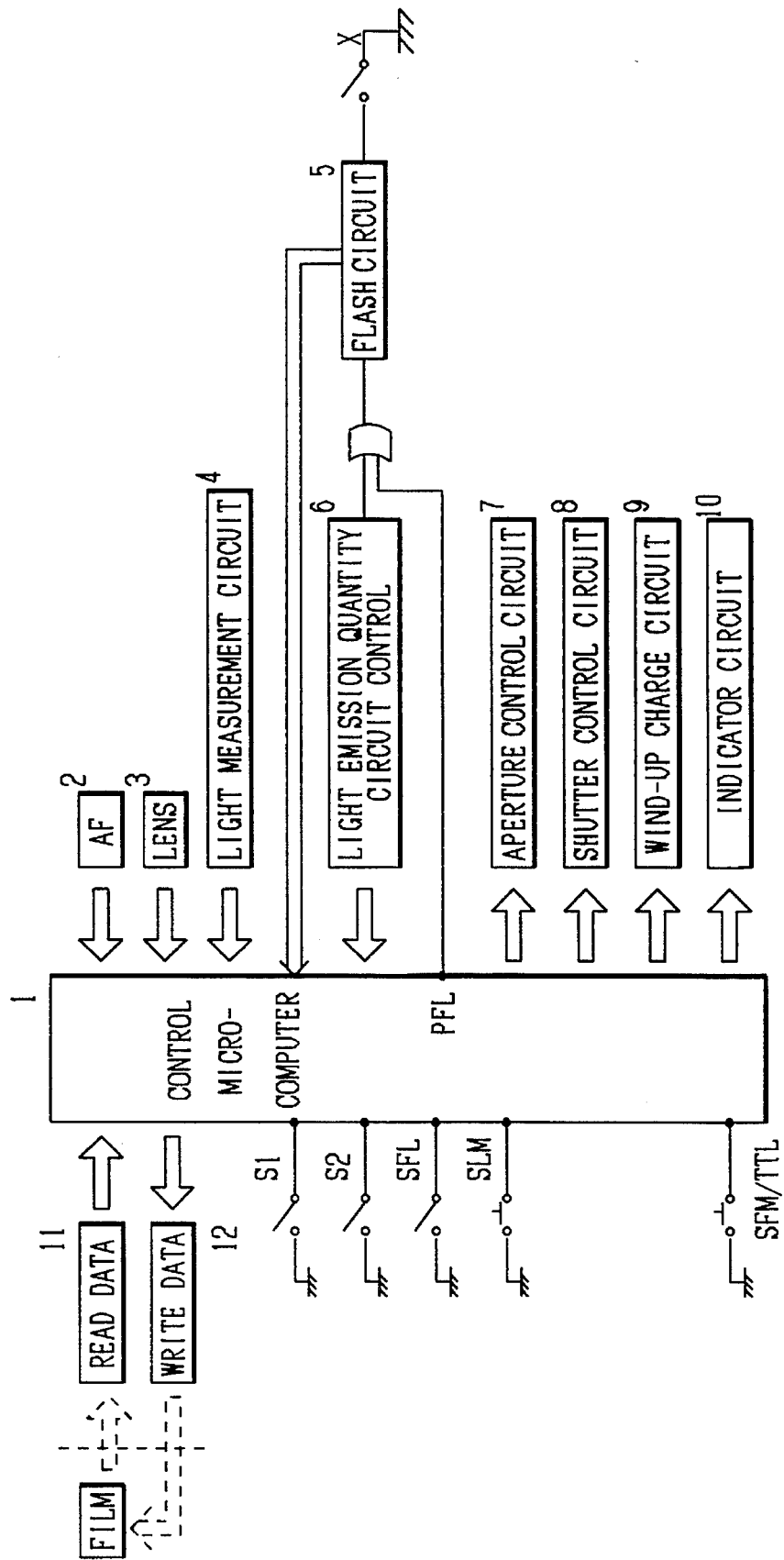
FIG. 1 is a view showing construction of circuit in a camera according to an embodiment of the present invention.

An embodiment of the present invention will be explained with reference to accompanying drawings. FIG. 1 is a view showing a circuit of a camera according to the present invention. The camera performs exposure calculation, focus adjustment calculation, sequence control and the like by a micro computer 1, to which various sorts of circuit 2–12 are connected such as an auto-focus (AF) control circuit 2, a lens circuit 3, and a light measurement circuit 4. Further, arranged at its input port are a group of switches such as a switch S1 for performing an operation for photographing and setting various conditions and a release switch S2.

Next, an explanation is given of the function of each circuit.

The AF control circuit 2 sends photoelectric conversion data of object Image in an AF area described later to the microcomputer 1 in order to perform focus adjustment by a TTL (through the lens) phase difference detecting method. A lens driving motor is controlled by an instruction from the microcomputer 1, and focus adjustment is performed thereby. Also, a present position of a lens is detected by an encoder, and a photographing distance obtained therefrom is sent to the microcomputer 1. The lens circuit 3 sends data specific to the lens attached to the camera, focal distance, minimum aperture value and maximum aperture value. The light measurement circuit 4 performs light measurement within a divided light measurement area, and sends brightness data of each area to the microcomputer 1. A flash circuit 5 has the following functions; sending guide number data of a flash to the camera; making the flash emit light when the X switch is turned ON; and stopping the emission by inputting emission stop signal. A flash light an emission quantity control circuit 6 receives film sensitivity data from the microcomputer 1, starts light measurement of the flash light responsive to an instruction from the microcomputer 1 and outputs a signal when reaching a light amount that is predetermined in response to the film sensitivity. A logical AND combination of this output signal and an output from an output port PFL of the microcomputer is inputted to the above flash circuit 5 as the emission stop signal.

An aperture control circuit 7 controls the less aperture corresponding to an aperture value instructed from the microcomputer 1. A shutter speed control circuit 8 keeps a shutter open for a time period instructed by the microcomputer 1, and thereby a film is exposed. A wind-up/charge circuit 9 winds up the film and charges a mechanical system. An indicator circuit 10 indicates data such as an aperture value, shutter speed value, light measurement mode and flash control mode. A reading circuit 11 reads various kinds of data such as ISO sensitivity of the film, maximum, minimum and γ value of latitude, recorded on a film patrone, and sends the data to the microcomputer 1. A writing circuit 12 writes data sent from the microcomputer 1 onto a magnetic record section on the film. The contents of the data to be written will be described later.

Next, an the explanation will be given of main switches. When the switch S1 is turned ON, pre-phototaking operations such as AF, light measurement and calculation for exposure are started. When the switch S2 is turned ON, the photographing operation is started. In case the switch SFL is ON, a flash unit automatically emits light, and in case it is OFF, flash light emission is prohibited. The switch SLM switches over the light measurement mode; each time it is turned ON, the light measurement mode is switched to multi-area light measurement, average light measurement and spot light measurement in order, wherein average light measurement is replacable by center-weighted light measurement. A switch SFM/TTL switches over the flash control mode to TTL light emission quantity control and FM control in order, each time it is turned ON.

Figure 2:
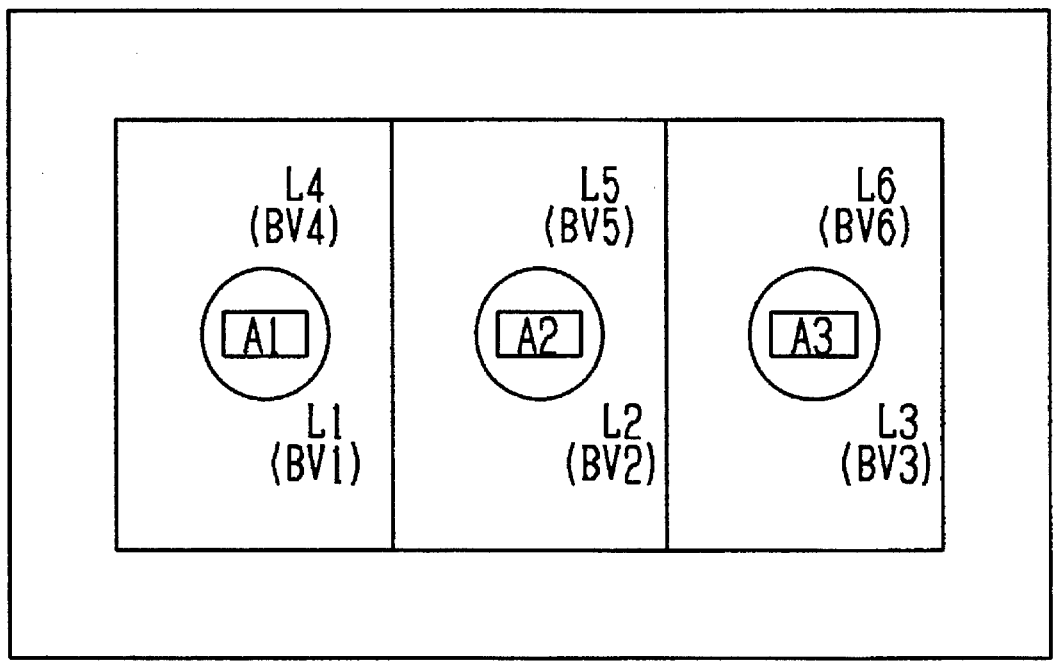
FIG. 2 is a view showing construction of light measurement area and auto-focus area of the camera.

FIG. 2 shows shows the construction of the light measurement area and AF area of the camera. In the camera according to the present embodiment, by separating the main object portion and the background portion in performing light measurement, it becomes possible to judge whether an object is backlit or not at the time of photographing, and further to obtain an appropriate exposure in case the object is judged to be backlit. The judgment of the main object is carried out by using the AF system. In order to handle the case when the main object exists outside of a center portion of an image frame 21, the camera provides three AF areas A1, A2 and A3, among which an area nearest to the camera is judged to be the main object. In order to measure a main object portion on each AF area A1, A2 and A3, light measuring devices L1, L2 and L3 are arranged. Further, light measuring devices L4, L5 and L6 are disposed around the devices so as to measure the background portion. In this way, main object illuminance and background illuminance in the portion judged by the AF system are measured.

Figure 3:
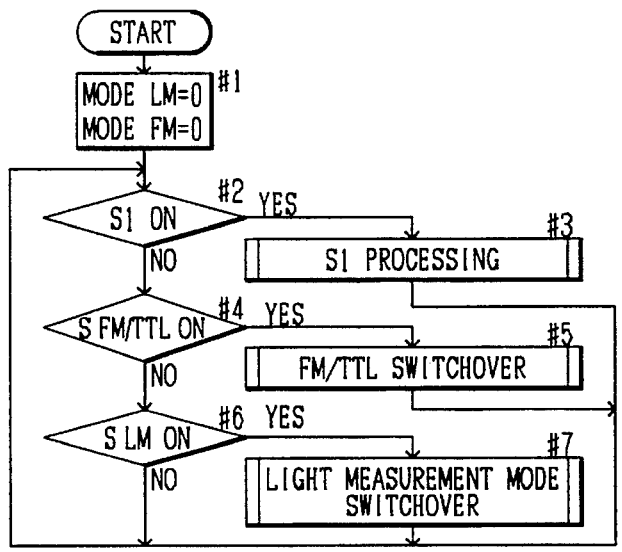
FIG. 3 is a flow chart showing a whole control sequence of the camera.

FIG. 3 is a flow chart showing an order of controlling an overall camera operation, whose contents will be explained in the following. First, a flag MODE.FL indicative of the flash control mode (hereinafter referred to as MODE.FL) and a flag MODE.LM indicative of the light measurement mode (hereinafter referred to as MODE.LM) are set to 0 at step #1. In the MODE.LM, 0 represents TTL light emission quantity control, 1 FM (flashmatic) control. In the MODE.FL, 0 represents multi-area light measurement, 1 average light measurement and 2 spot light measurement. In succession, whether the switch S1 is ON or not is judged at step #2. In case it is ON, the process returns to the judgment at step #2, after performing a processing S1 at #3, which is a pre-phototaking operation. In case the switch is OFF, whether or not the switch SFM/TTL is ON is judged at #4, and in case it is ON, the process performs FM/TTL switchover processing and returns to the judgment at #2. In case the SFM-TTL switch is OFF, whether or not the switch SLM is ON is judged at #6. In case it is ON, light measurement mode switchover is performed processing at #7, and the process returns to the judgment at step #2. In case the switch is OFF, the process directly returns to step #2. The contents of the above-mentioned S1 processing. FM/TTL switchover processing and light measurement mode switchover processing steps will be described in detail later.

Figure 4:
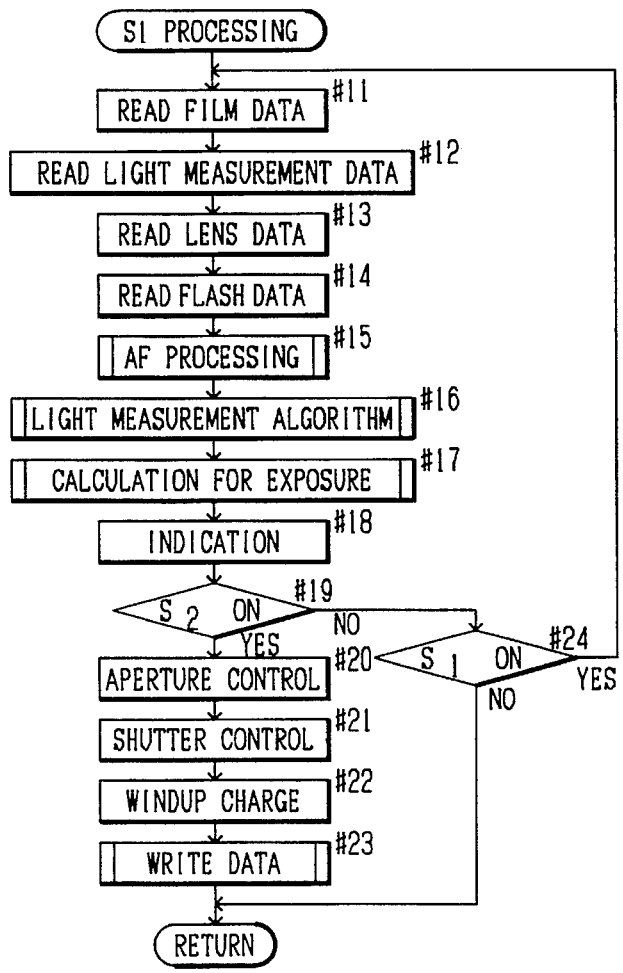
FIG. 4 is a flow chart showing S1 processing.

Now explanation will be made about the S1 processing at above-mentioned step #3, with reference to the flowchart shown in FIG. 4. First, film data recorded on the film patrone such as ISO sensitivity (SVref), latitude (SVmax, SVmin) and γ value are read. In the described embodiment, it assumes that the above-described film data is recorded on the film of the camera in use; otherwise, the data is added to a patrone of the film. Subsequently, the light measurement circuit 4 reads respective BV values of the light measurement device L1–L6 divided into 6 elements, setting them to variables BV1–BV6. Each correspondence between a variable and a light measuring area is as shown in FIG. 2. At step #13, data on minimum aperture value, maximum aperture value and focal length are read out from the lens. At step #14, guide number data IV from the flash is read.

The process performs focus adjustment AF processing at step #15, light measuring processing which determines control brightness value BV at step #16, and exposure calculation processing at #17, whereby an AV value and a TV value for use in photographing are computed from the value of control brightness BV. Thereafter, the AV value and the TV value are output to the indicator circuit 10 at step #18. The contents of these AF processing, light measuring processing and exposure calculation processing will be described later. Successively, It is judged at #19 whether or not the release switch S2 is ON. In case it is ON, an exposing operation is effected by processing subsequent to step #20. In case it is OFF, the process advances toward step #24 to judge whether or not the switch S1 is ON. In case of ON, the process returns to the step #11 and repeats a series it is processings. In case the switch is OFF, the process returns.

At the step #20, an AV value obtained by the calculation for exposure is output to the aperture control circuit 7, and thereby an aperture is set to the aperture value. Then, at step #21, a TV value obtained by the calculation for exposure is output to the shutter speed control circuit 8, and the film is exposed at a shutter speed corresponding to this TV value. In succession, a film wind-up operation, shutter and aperture are charged at step #22 by driving the wind-up/charge circuit 9. Further, at step #23, data concerning a correction flag which indicates whether or not correction is necessary at the laboratory, a backlight flag which indicates whether or not a light condition is backlight, and a flag (FLM) which indicates whether or not flash light is emitted, the position of the main object and the photographic magnification β, respectively, are written onto the film, and the process returns.

Figure 5:
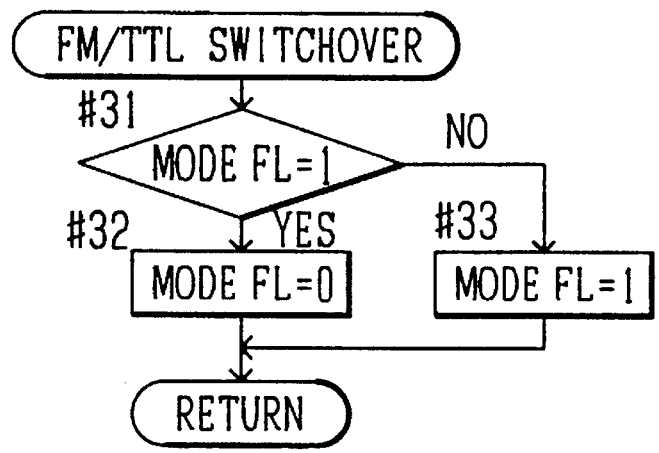
FIG. 5 is a flow chart showing FM/TTL switchover processing.

FIG. 5 is a flowchart showing the FM/TTL switchover processing at the above-mentioned step #5. In this processing, whether or not the current flash control mode is FM control, namely, whether the MODE.FL is 1 or not, is checked at step #31. In case of FM control, the process advances toward step #32 and therein sets the MODE.FL to 0 for switching to TTL light emission quantity control. If the mode is TTL light emission quantity control at the step #31, the process advances toward step #33 and sets the MODE.FL to 1 for switching to FM control.

Figure 6:
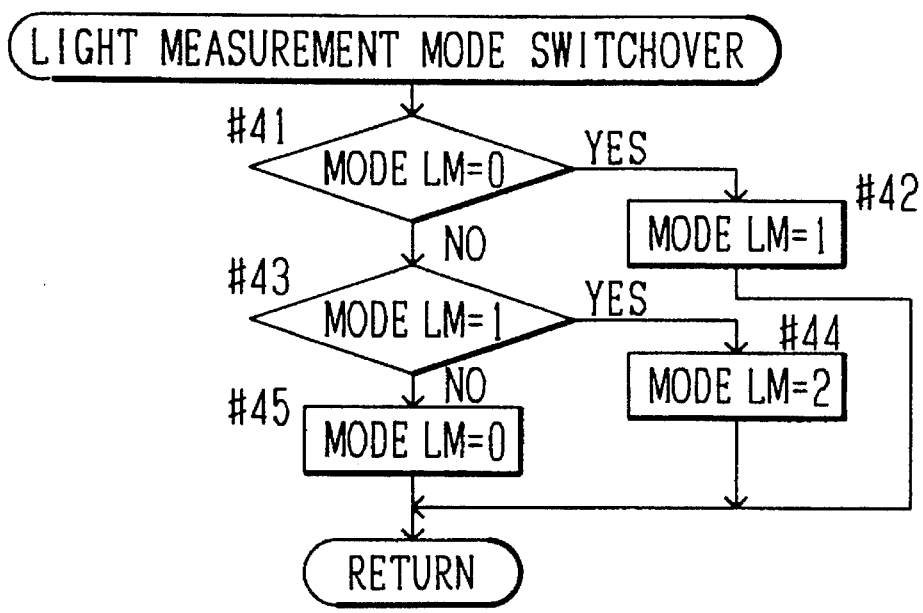
FIG. 6 is a flow chart showing light measurement mode switchover processing.

FIG. 6 is a flow chart showing the light measurement mode switchover processing at the above-mentioned step #7. At step #41, it is judged whether or not the current light measurement mode is multi-area light measurement, that is, whether or not the MODE.LM is 0. In the case of multi-area light measurement, the process advances toward step #42, and sets the MODE.LM to 1 for switching to average light measurement. If not it is multi-area light measurement, the process advances toward step #43, wherein a judgment is made whether the MODE.LM is 1 or not, namely, whether the current mode is average light measurement or not. In the case of average light measurement, the process proceeds to step #44 and sets the MODE.LM to 2 for switching to spot light measurement. Unless average light measurement is selected at the step #43, the process advances toward step #45 and sets the MODE.LM to 0 for switching to multi-area light measurement.

Figure 7:
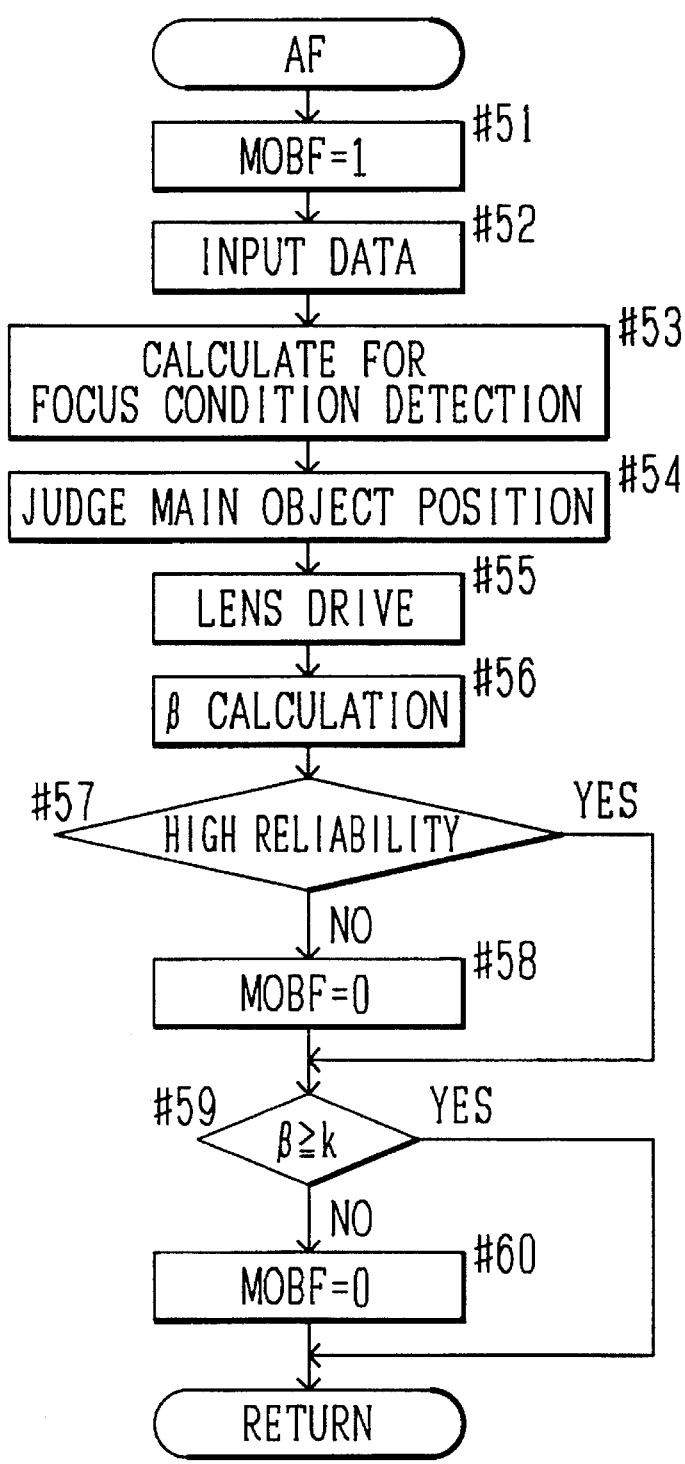
FIG. 7 is a flow chart showing auto-focus processing.

FIG. 7 is a flow chart showing the AF processing at the aforesaid step #15. First, a flag MOBF indicative of reliability of the main object data is set at step #51. This main object data represents such information as distance and position obtained by AF, brightness according to AE or the like. A state of 1 set in the flag MOBF indicates high reliability, while a 0 state indicates low reliability. Thereafter, illuminance distribution data is input at step #52 from the CCD of each AF area, A1, A2 and A3. At step #53, a defocus amount of the object on each AF area is calculated from a correlation of the illuminance distribution data obtained by focus condition detecting calculation.

At step #54, comparing one defocus amount obtained in the above manner with another, an object in the area showing the smallest defocus amount, nearest to the camera body, is determined to be a main object, and the AF area number thereof is set in a variable AF which represents object position. This object position data is used to select the proper light measurement area at the time of multi-area light measurement by the camera and the proper one at the time of light measurement for printing as well. Further, a command is output to the lens circuit 3 from the microcomputer 1 at step #55, whereby the lens is driven so that a defocus amount of the discriminated main object becomes 0. At step #56, the photographic magnification β is computed from thee focal length of the lens and the object distance data read out from the lens.

Further in succession, reliability of the AF data is judged at step #57. If either one of following two conditions is established, the reliability is estimated to be low; an output level of the CCD data at the step #52 is lower than a given value, namely, S/N ratio is bad; the correlation value, obtained as a result of the correlating calculation at the step #53, is less than a given value. In such a case, the flag MOBF is reset to 0 at step #58. In case the reliability is estimated to be high at the step #57, the process skips the step #58. Then, it is checked at step #59 whether the photographic magnification β is larger than or equal to a predetermined value k. If it is smaller than k, 0 is set in the flag MOBF at step #60, since a proper light measurement operation is prevented when the photographic magnification β is small, which means a ratio of the width an object to the light measurement area is low. In case that the magnification β is larger than or equal to k, the process returns, without executing the step #60.

Figure 8:
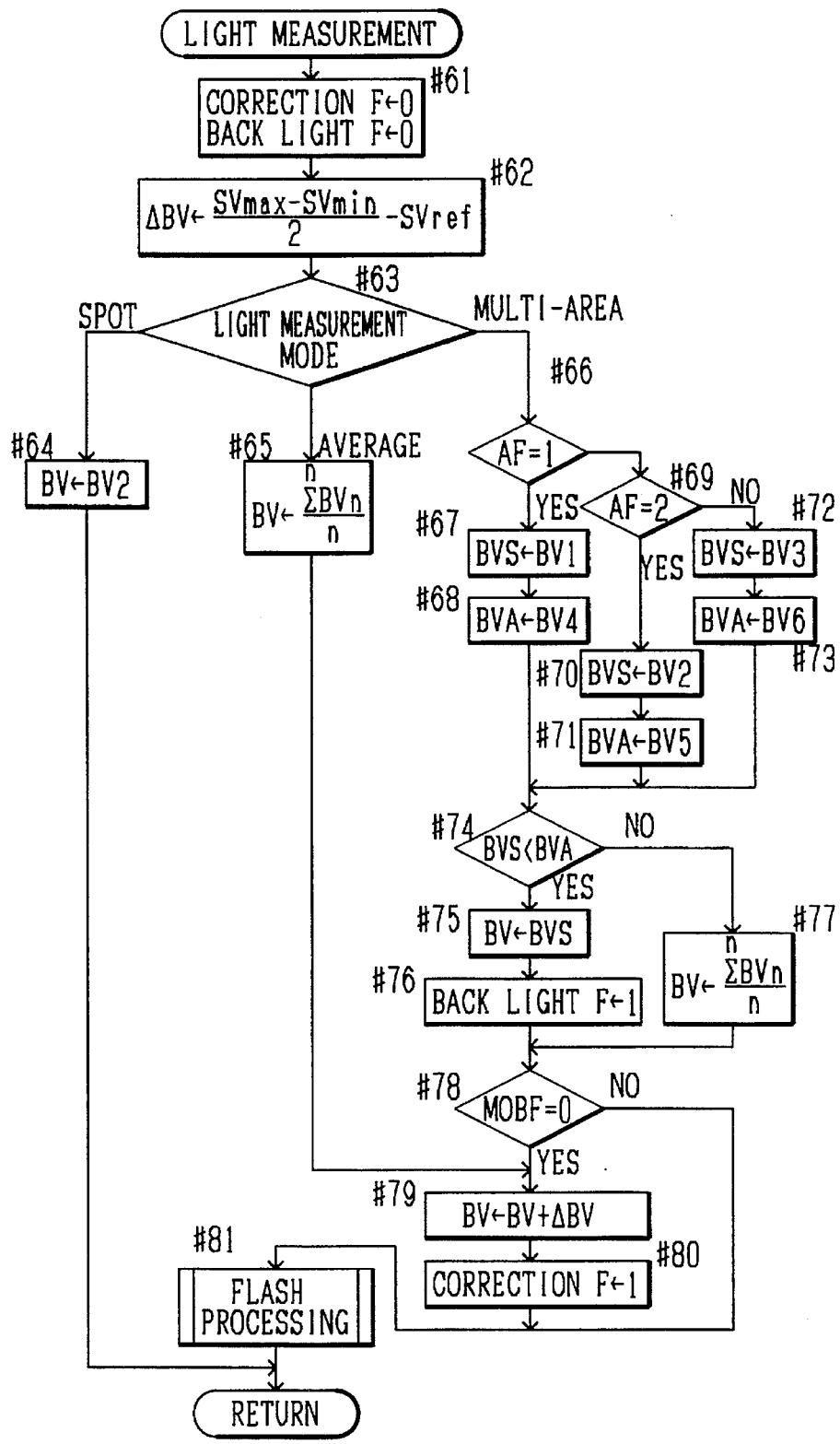
FIG. 8 is a flow chart showing light measurement processing at a time of photographing.

FIG. 8 is a flow chart showing light measurement processing at the aforesaid step #16. At step #61, a correction flag to indicate whether or not an exposure correction at the time of printing in the laboratory is necessary and a backlight flag to indicate whether or not the light condition is backlight are reset. A correction flag state of 0 shows that exposure correction is unnecessary at the time of printing, while a state of 1 shows the necessity of the correction. A backlight flag state of 0 shows that the object was not backlit at the time of photographing. On the other hand, a state of 1 shows that the object was backlit when photographed. Next, at step #62, an exposure amount difference $\Delta BV$ up to a center point of the latitude is computed from an ISO sensitivity specific to the film. That is, the $\Delta BV$ is obtainable from the following equation, wherein SVref stands for the specific ISO sensitivity, SVmax stands for a largest limit of the exposure amount of the latitude and SVmin stands for a smallest limit thereof:

$$\Delta BV=(SVmax-SVmin)/2-SVref$$

Successively, based on the value of MODE.LM, it is judged at step #63 which light measurement mode is set, spot light measurement, average light measurement or multi-area light measurement. In the case of spot light measurement, average light measurement and multi-area light measurement, the process proceeds to step #64, #65 or #66, respectively. At the step #64, a brightness value BV2 of a center portion of the image frame is set in a control BV value and thereafter the process returns. At the step #65, an average value of all the light measurement devices is set in the control BV value, and the process proceeds to processing at step #79, which will be described later. In steps #66–#73, a main object brightness BVS and a background brightness BVA are determined based on data about an area judged to be the main object by AF. That is, in case the variable AF is 1, it is rendered that BVS=BV1, BVA=BV4; in case the variable AF is 2, it is rendered that BVS=BV2, BVA=BV4; and otherwise, it is rendered that BVS=BV3, BVA=BV6.

Next, at steps #74–#77, whether the light condition at the time of photographing is backlight or not is judged, and a control BV value corresponding to each judgment is decided. Namely, in a comparison of the main object brightness BVS with the background brightness BVA, it is judged to be a backlight condition if the BVS is less, the main object brightness BVS is set in the control BV value and the backlight flag is set to 1 for indicating that the object is backlit. On the other hand, if the BVS is not less than the BVA (including the case of being equal to it), the average value of all the light measurement devices is set in the control BV value. In succession, whether an object information is reliable or not is judged at step #78. In the case that the flag MOBF is 0, which means low reliability, an intermediate value of the film latitude is set at step #79 in the control BV value, and at the same time, 1 is set at step #80 in the correction flag indicating that correction in the laboratory is necessary. This is done to obtain a proper print by means of light measurement in the laboratory. At the time of photographing on the camera side, an exposure operation is carried out in such a manner as to keep the loss of object brightness data at a minimum. Meanwhile, if the flag MOBF is 1 at the step #78, which means high reliability, the process advances directly to a flash processing at step #81, since exposure correction at the laboratory is not required. The control at steps #79–#80 is performed also in case of average light measurement, and the correction flag is set, because the light measurement data does not reflect main object position.

Figure 9:
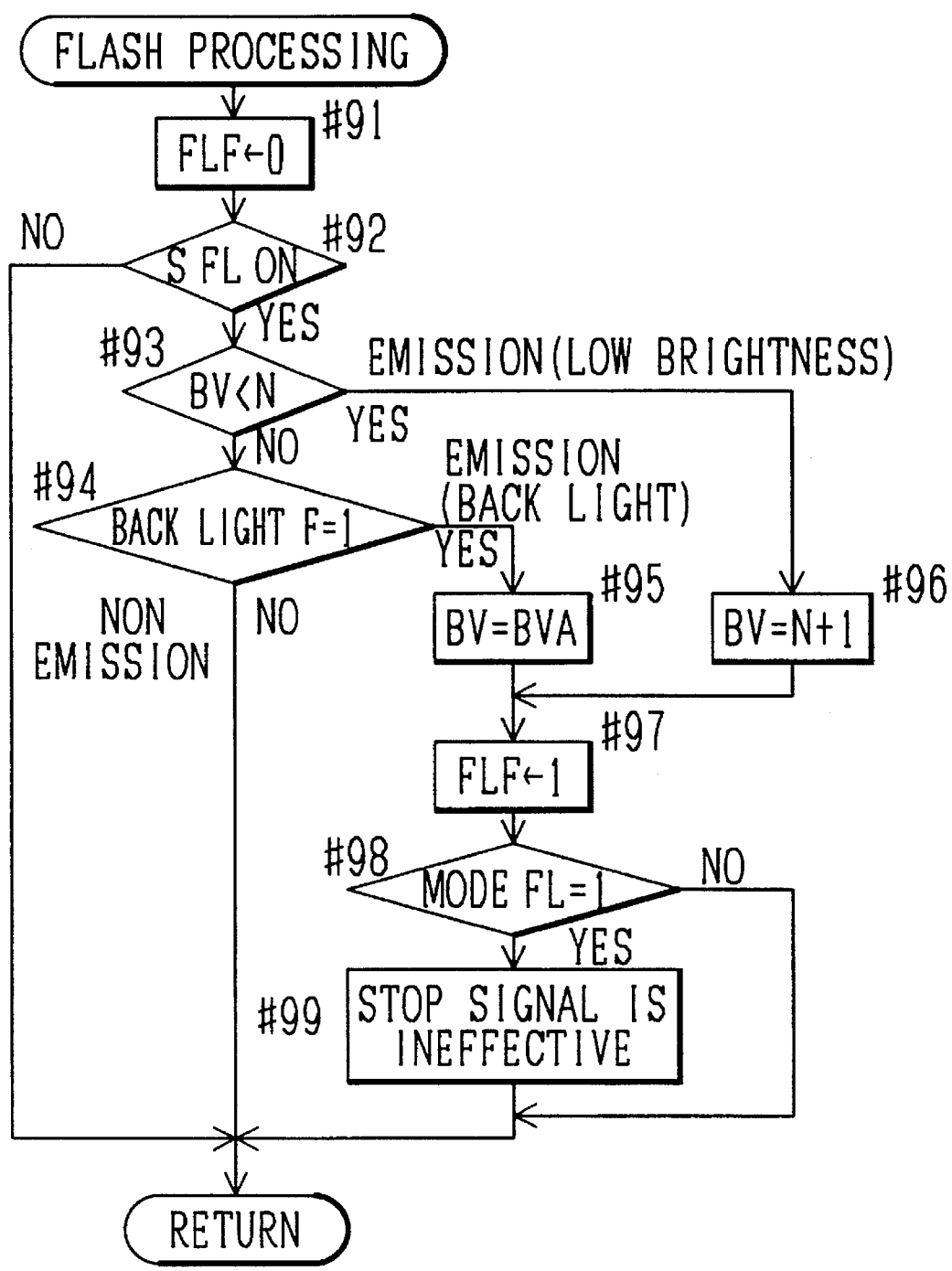
FIG. 9 is a flow chart showing light flash processing.

FIG. 9 is a flowchart showing the above mentioned flash processing at the step #81. At step #91, a flag FLF indicative of flash light emission is reset to 0. Next, it is checked at step #92 whether a flash switch SFL is ON or not. In case it is ON, the process proceeds to step #93. In case it is OFF, the process returns. At the step #93, it is checked whether the control BV value is less than a given brightness value N. In case it is less than N, which means that the main object is at low brightness, the process decides that flash light emission is necessary at the time of photographing and proceeds to step #96. Otherwise, the process advances toward step step #94, At the step #96, a predetermined brightness value N+1 is set in the control value, as a control value suitable for light emission at low brightness, and the process proceeds to step #97, wherein it is judged whether an object is backlit or not. In the case of backlight, it is determined that flash light emission is necessary, the process proceeds to step #95. Otherwise, it is determined that flash light emission is unnecessary, the process returns.

At the step #95, having set the background brightness value BV in the control BV value, as a control value suitable for flash photographing when an object is backlit, the process advances to step #97, and therein 1 is set in the flag FLF indicative of flash light emission. At step #98, it is checked whether the flash control mode is for TTL light emission quantity control or FM control. If 1 is set in the MODE.FL, namely, in the case of FM control, an output port PFL is set at a low level so as to render a stop signal ineffective at step #99. The output from the flash light emission quantity control circuit 6 can be made ineffective by rendering the port PFL low level, since a logical AND of the signal taken from this port PFL and an output from the circuit 6 is output to the flash circuit 5. On the other hand, when the MODE.FL is 0, namely in case of TTL light emission quantity control, the process returns.

Figure 10:
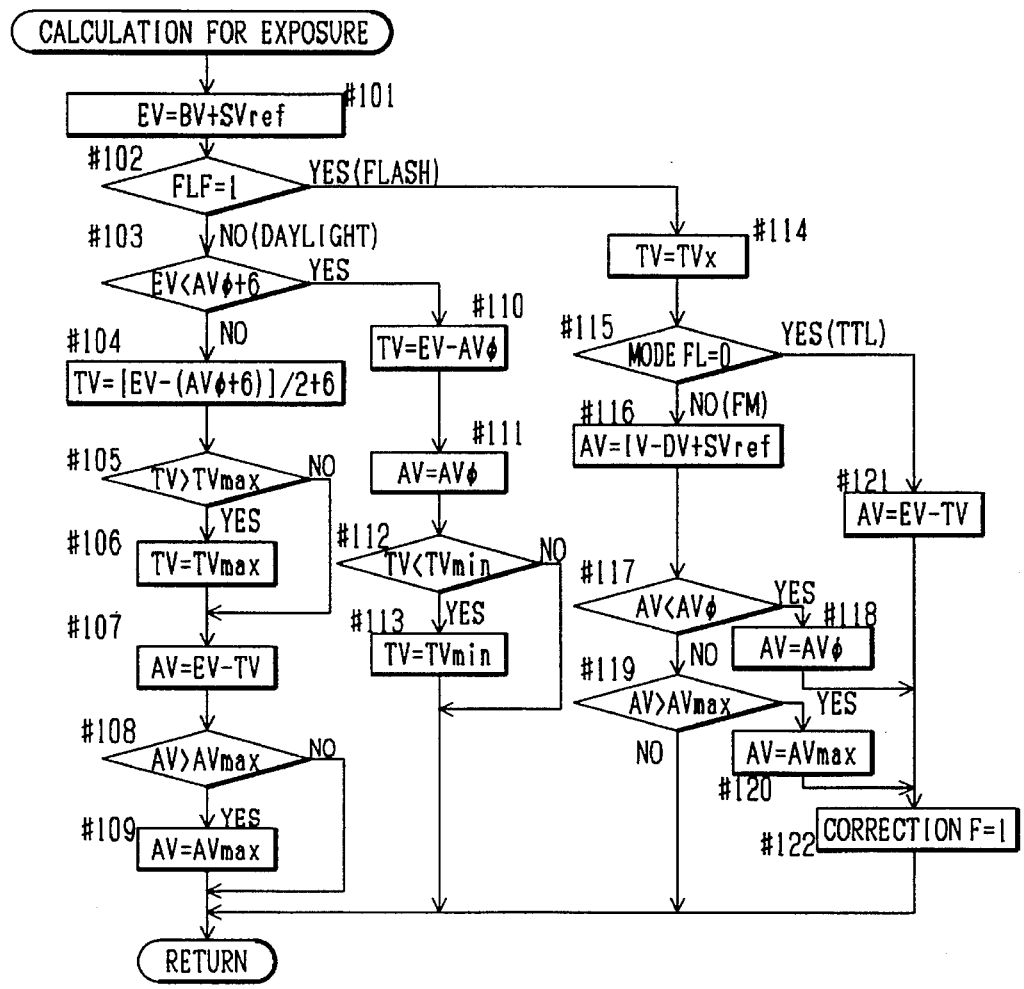
FIG. 10 is a flow chart showing exposure calculation processing.
Figure 11:
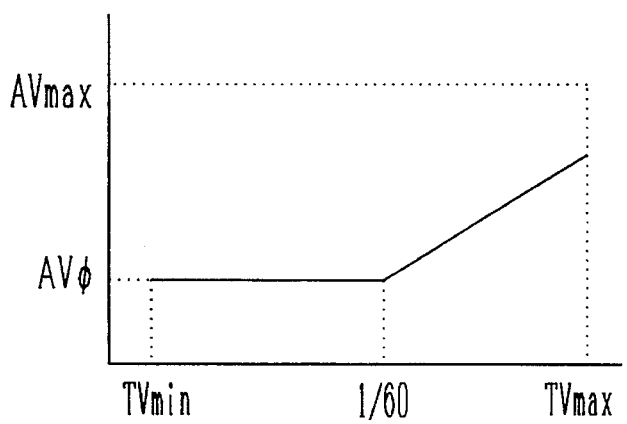
FIG. 11 is a program diagram showing stationary light photographing.

Next, referring to a flow chart in FIG. 10, an explanation will be given to the aforesaid processing at the step #17. First, a control EV value is computed at step #101 from the control BV value and the film ISO sensitivity SVref, and thereafter it is judged at step #102 whether the flash light is to be emitted or not. If it is not to be emitted, the process proceeds to step #103 and performs exposure calculation for stationary light. If the flash light is to be emitted, the process proceeds to step #114 and performs exposure calculation for flash photographing. An exposure calculation according to an AE program diagram, shown in FIG. 11, is performed at steps #103–#113. At step #114, the TV value is set in a synchroflash maximum speed TVX, and it is judged at the next step #115 whether the flash control mode is FM control or TTL light emission quantity control. In the case of FM control, the process advances to step #116. In the case of TTL light emission quantity control, the process advances to step #121.

At the step #116, an aperture AV value for FM control is computed from the guide number information IV, distance information DV and the film ISO sensitivity SVref. Then it is judged at step #117 whether or not the computed AV value is less than a minimum AV value. If it is less than the minimum AV value, the AV value is set equal to the minimum AV value at step #118. In this case, an aperture value necessary for FM control is not obtainable, which results in an improper exposure. Accordingly, the correction flag is set at step #112 so as to compensate and correct the exposure deficiency as much as possible by a correction in the laboratory. In case the AV value is more than the minimum AV value at step #117, the process advances to step #119, and therein it is judged whether the computed AV value is more than a maximum AV value. In the case where it is greater than the maximum value, the AV value is made maximum value at step #120. In this case, too, an aperture value necessary for FM control is not obtainable, which results in an improper exposure. Accordingly, the correction flag is set at the step #112 so that exposure deficiency is compensated and reduced to a minimum by the correction in the laboratory. In the case where the AV value is less than maximum AV value, the process returns directly since proper exposure is enabled by FM control. At the above step #121, an aperture AV value for TTL light emission quantity control is computed from the control EV value and the TV value. In the case of TTL light emission quantity control, even if the object is at the same distance, an amount of flash light which returns to the light receiving device changes, depending on size of the object. As a result, exposures are distributed irregularly off a proper value. The correction flag is set at step #122 so that this irregularity is subject to the exposure correction in the laboratory.

FIG. 12(a) is a flow chart showing data writing processing at the step #23 in the above S1 processing. FIG. 12(b) is a chart showing the contents of the data (information) written onto film by the processing. In the above described embodiment (referred to as the basic embodiment), in case of exposure at sufficiently high accuracy on the camera side, the correction flag is registered (i.e., 0 is registered in the correction flag at the step #61) as a signal, making exposure correction in the laboratory unnecessary. However, as described hereinafter, there are other methods applicable to this processing. That is, having designated a light measurement area to be measured in the laboratory, the same portion as the light measurement area is subject to light measurement by the camera at the time of photographing. Thereafter, an exposure correction amount is obtained from the difference in brightness between this light measurement value and the main object brightness, whereby printing is carried out. Further, this method can be divided into two; one (first modification) is the case where the exposure correction amount is computed in the laboratory; the other (second modification) is the case where it is computed in the camera. FIGS. 12(c) and (d) show flow chart and data (information) contents of data writing processing according to the first modification. FIGS. (e) and (f) show those according to the second modification. The data writing processing in the respective cases is described hereinafter.

In the first modification shown in FIGS. 12(c) and (d), a difference of brightness ΔBVC between the control BV value and a brightness value BV1 of a center light measurement area is obtained. Thereafter, the data is recorded onto the film, and the process returns. Among the data contents shown in FIG. 12, the light measurement instruction flag is the same as the correction flag in the basic embodiment in its set/reset condition on the camera side, though called differently in accordance with processing on the laboratory side. In the laboratory, a print with proper density becomes possible, by multiplying ΔBVC by the γ value of the film and adding a light measurement value of a designated area thereto.

In the second modification shown in FIGS. 12(e) and (f), the camera computes an exposure correction amount ΔD on the laboratory side, which is obtained by multiplying a brightness difference between the control BV value and the brightness value BV1 of the center light measurement area by the γ value of the film. When multiplied by the γ value of the film, the brightness difference is converted into a density difference of the film, which corresponds to a brightness difference in the laboratory. Following this, the data is recorded onto the film, and the process returns. Among the data contents shown in FIG. 12, the light measurement instruction flag is the same as the correction flag of the basic embodiment in its set/reset condition on the camera side, though called differently in accordance with processing on the laboratory side. In the laboratory, a proper print is obtainable, using the addition of this correction value and the light measurement value of the designated area.

Figure 14:
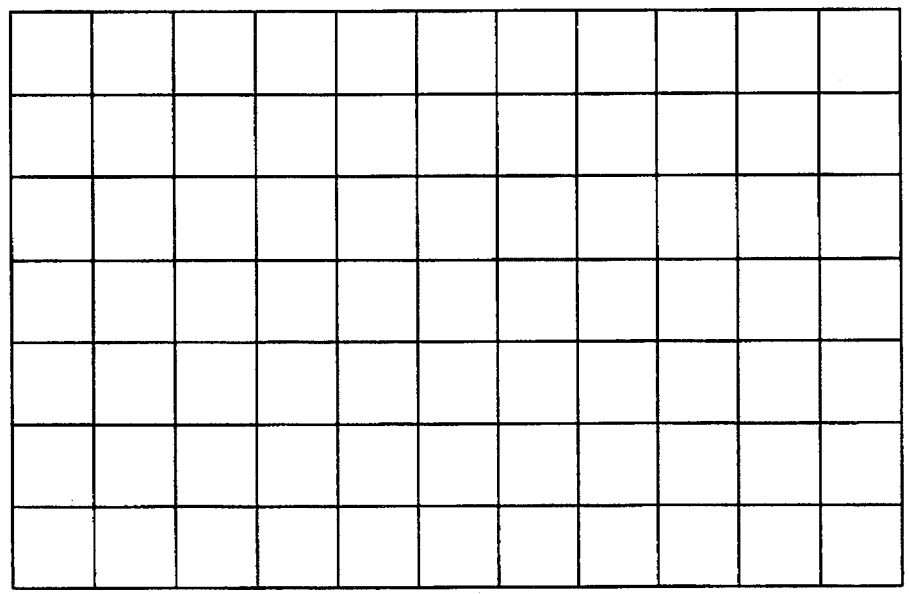
FIG. 14 is a view showing light measurement areas on laboratory side.
Figure 15:
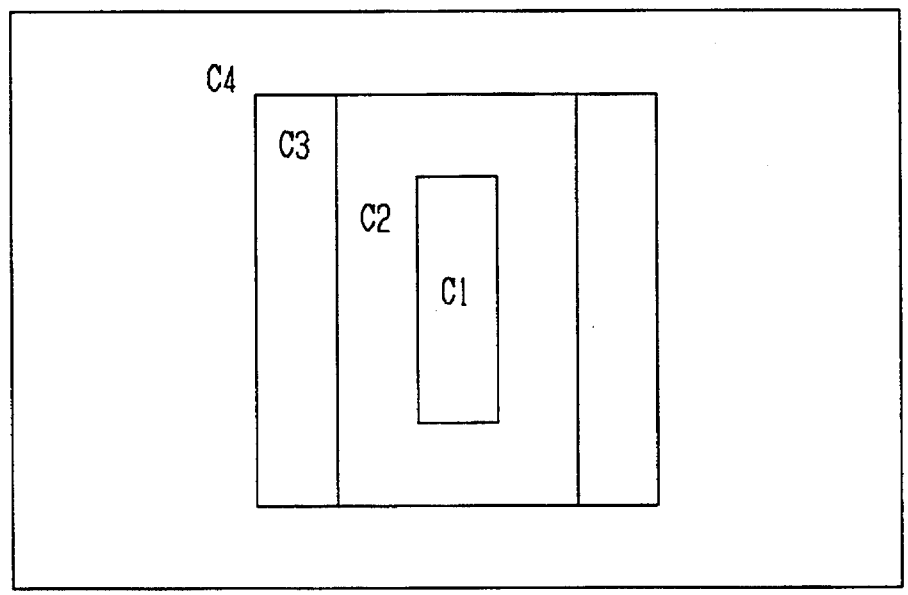
FIG. 15 is a view showing a pattern 1 of the light measurement area.
Figure 16:
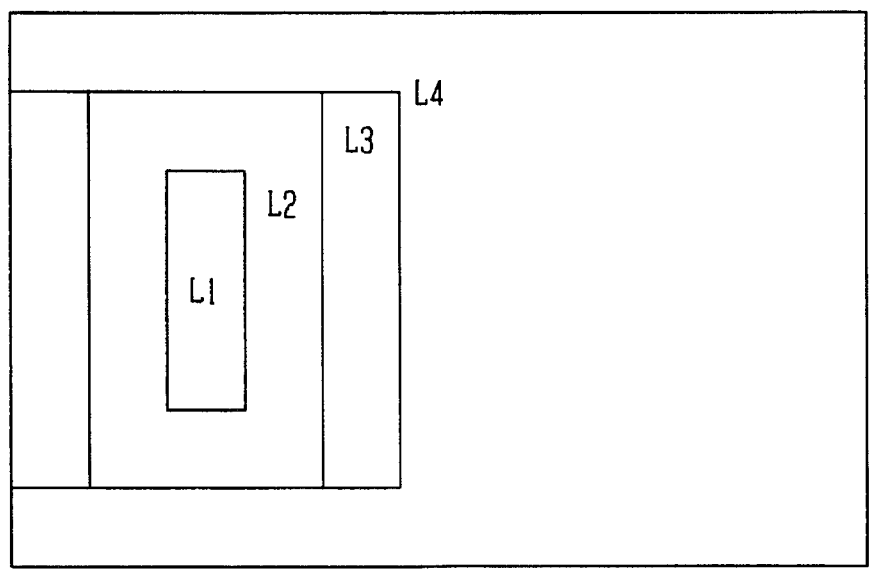
FIG. 16 is a view showing a pattern 2 of the light measurement area.
Figure 17:
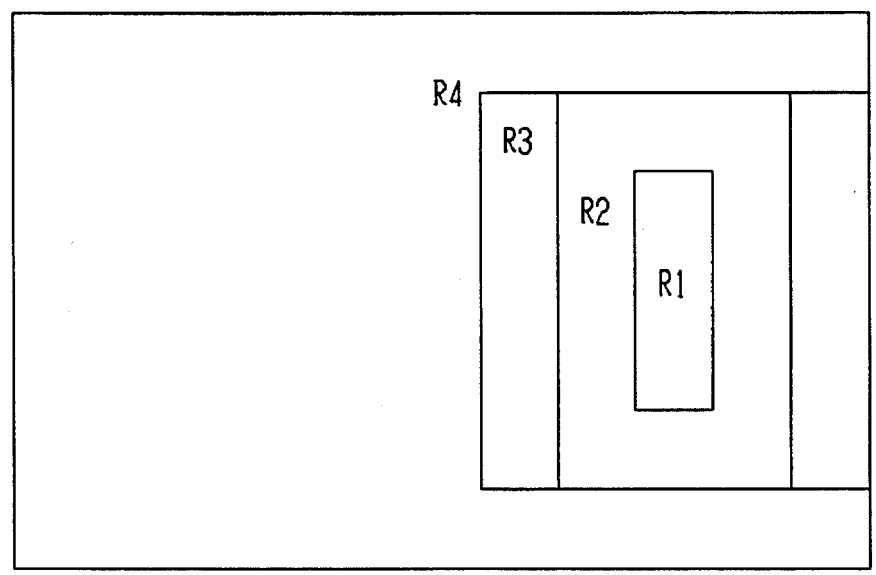
FIG. 17 is a view showing a pattern 3 of the light measurement area.

Next, an explanation will be made about a printer on the laboratory side for use in combination with a camera of the present embodiment, with reference to FIG. 13 showing a circuit construction thereof. This printer comprises a microcomputer 21 for controlling the printing operation, a light measurement circuit 22, an exposure device 23 and reading means 24 for reading magnetic data and the like recorded on the film. The light measurement circuit 22 performs light measurement by dividing the negative film surface into 11×7 areas as shown in FIG. 14 and sends only the light measurement value of a device corresponding to the designated light measurement area to the microcomputer 21, based on the designation of a light measurement area from the microcomputer 21. There are 12 patterns of light measurement area, i.e., C1–C4 in FIG. 15, L1–L4 in FIG. 16 and R1–R4 in FIG. 17. The exposure device 23 has a function of controlling an amount of light from a light source in accordance with an exposure amount sent from the microcomputer 21 and exposing the printing paper. Construction of the transportation of the film and printing paper along with exposure, which has no direct relation with the present invention, is not explained here.

Figure 18:
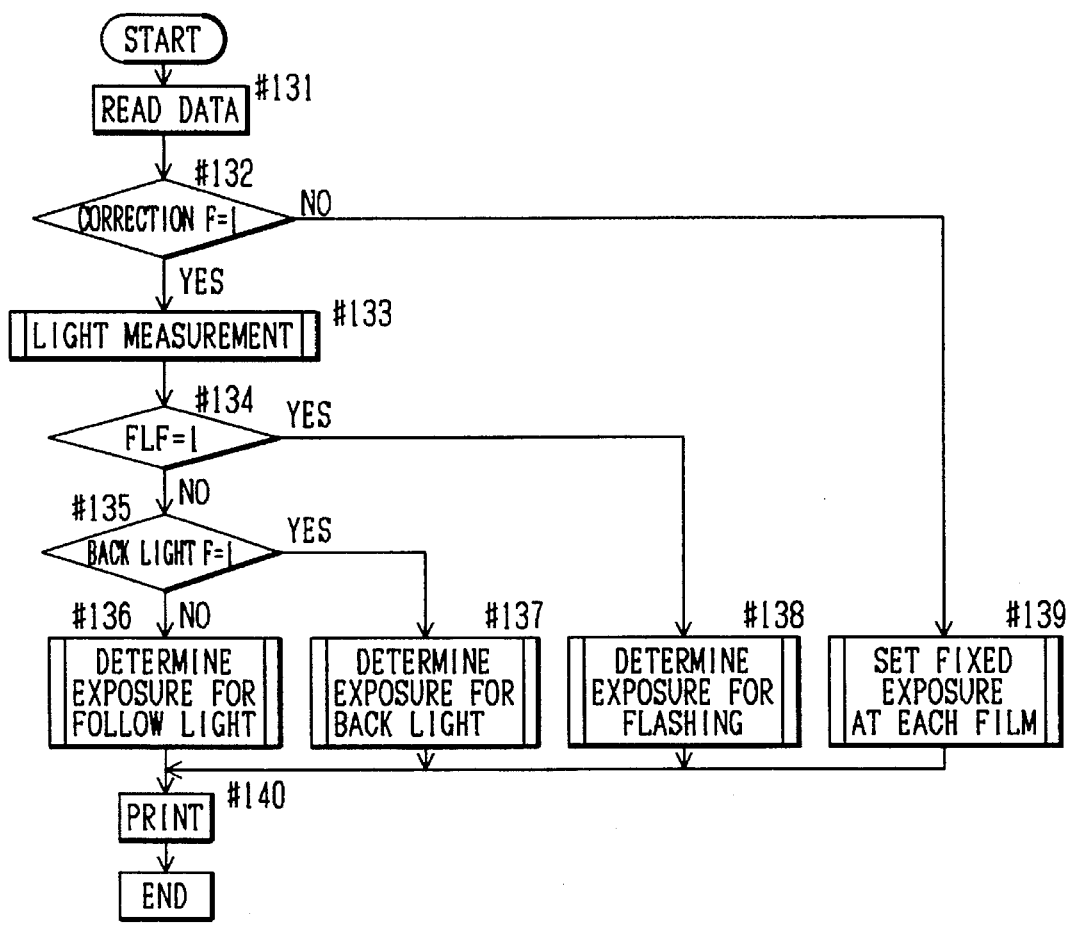
FIG. 18 is a flow chart showing printing processing in the laboratory.

Next, an explanation will be given of a control operation of the printer on the laboratory side for use in combination with the described embodiment, referring to a flow chart shown in FIG. 18. First, data recorded on the film is read at step #131, of which its contents are as follows: a correction flag which indicates whether or not exposure at the time of printing is necessary, as registered by the camera; object position; photographing magnification; flash flag which indicates whether or not flash light is emitted; backlight flag which indicates whether or not an object is backlit; and data on standard exposure amount (BVO) specific to respective film characteristics necessary for printing. Subsequently, whether correction is necessary or not is judged at step #132. If the correction flag is set, it is determined that the correction is necessary, and the process proceeds to step #133. In case the flag is not set, it is judged that the correction is unnecessary, the process proceeds to step #139 to set a predetermined exposure amount for respective films. A the step #133, the most appropriate light measurement area is decided from the object position data and the photographing magnification data, and the area is subject to light measurement, as will be described in detail later.

Figure 19:
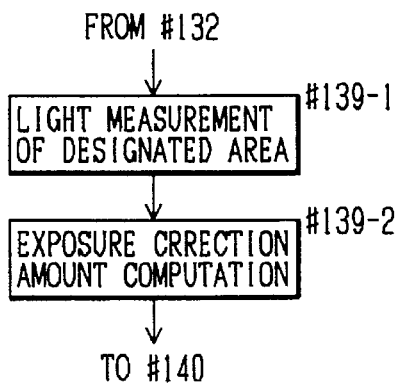
FIG. 19 is a flow chart showing a part of the printing processing according to a modification.

Following the light measurement processing, it is checked at step #134 whether it is flash photographing or not. In case the flash flag FLF is not set, stationary light photographing is to be performed. The process advances to step #135 to judge whether the light condition is backlight or not. In case the flash flag FLF is set, flash photographing is to be performed. Therefore, the exposure is determined through an exposure algorithm for flashing (#138). Unless the backlight flag is set at step #135, exposure is determined through a light measurement algorithm for follow light (#136). If the backlight flag is set, the exposure is determined through light measurement for backlight (#137). After each determination of exposure, printing is carried out for a determined exposure time period (#140). FIG. 19 shows a variation of the processing at the step #139, wherein a correction value for exposure is computed by light measurement of the designated area.

Figure 20:
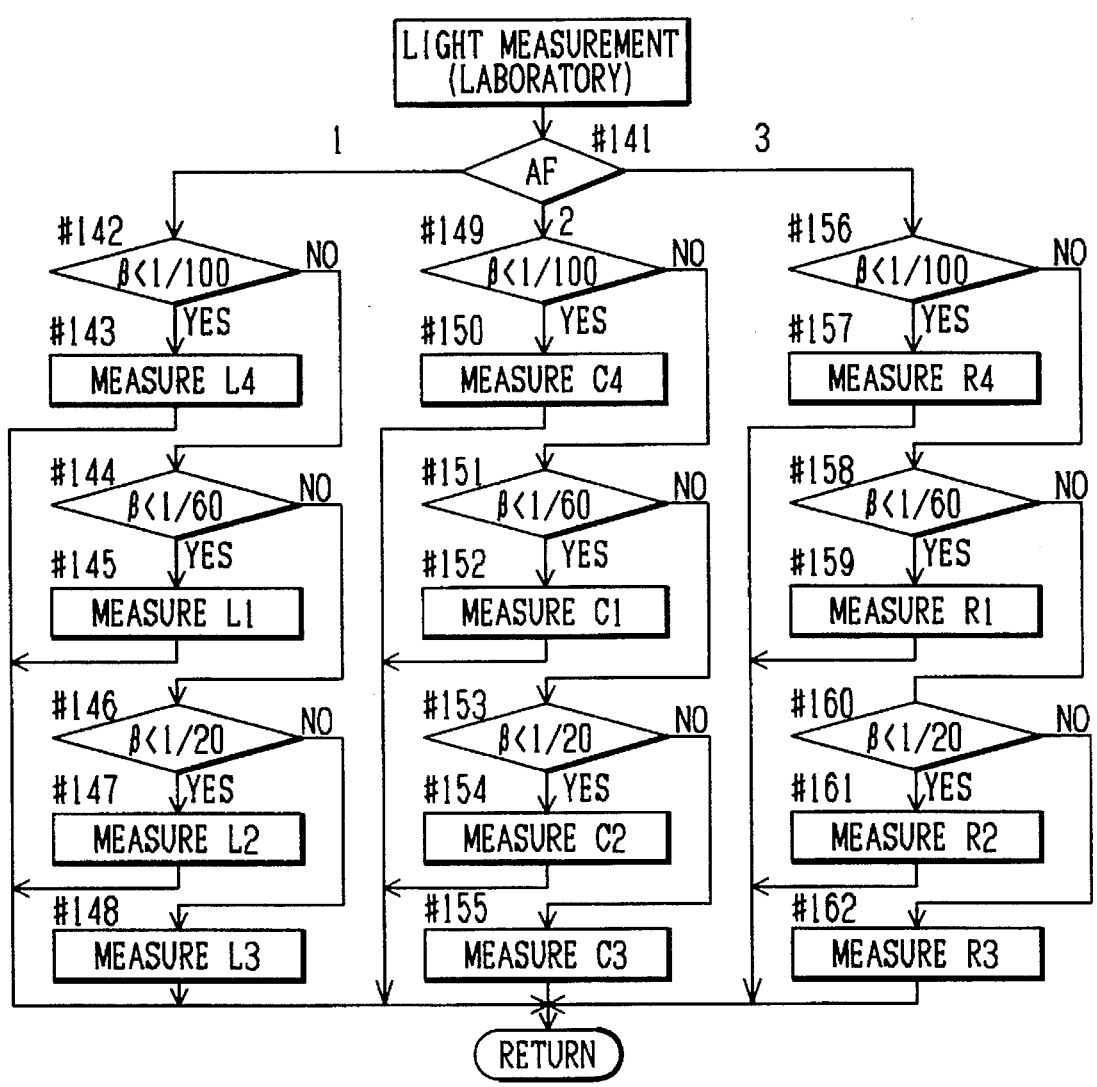
FIG. 20 is a flow chart showing light measurement processing in the laboratory.

FIG. 20 is a flow chart showing light measurement in the laboratory. First, a position of the main object is judged at step #141 from AF area data recorded on the film. In case a variable AF is 1 (i.e., left), the process proceeds to step #142. If the variable AF is 2 (i.e., center), the process proceeds to step #149. In case the variable AF is 3 (i.e., right), the process proceeds to step #156. At the step #142, it is checked whether the photographing magnification β is less than 1/100. In the case where it is less than 1/100, since the probability of photographing a distant landscape or the like is high, the process proceeds to step #143, selecting L4 (shown in FIG. 16) as a light measurement pattern, wherein an entire image frame is rendered as the light measurement area, and returns. In case the magnification in value is more than 1/100, the process proceeds to step #144, wherein it is checked whether the photographing magnification β is less than 1/60. In case it is less than 1/60, the process advances to step #145, selects L1 as a light measurement area and returns. In the case where it is more than 1/60, the process advances to step #146, and checks whether the photographing magnification β is less than 1/20. If it is less than 1/20, the process proceeds to step #147, selects L2 as a light measurement area and returns. In case it is more than 1/20, the process proceeds to step #148, selects L3 as a light measurement area and returns. At steps #149–#155, a center light measurement area is subject to judgment similar to the foregoing. As a result, selecting one of light measurement areas C1–C4 (shown in FIG. 15), the process returns. At steps #156–#162, a right-hand light measurement area is subject to judgment similar to the foregoing. Thereafter, the process selects one of light measurement areas R1–R4 (shown in FIG. 17) and returns.

Figure 21:
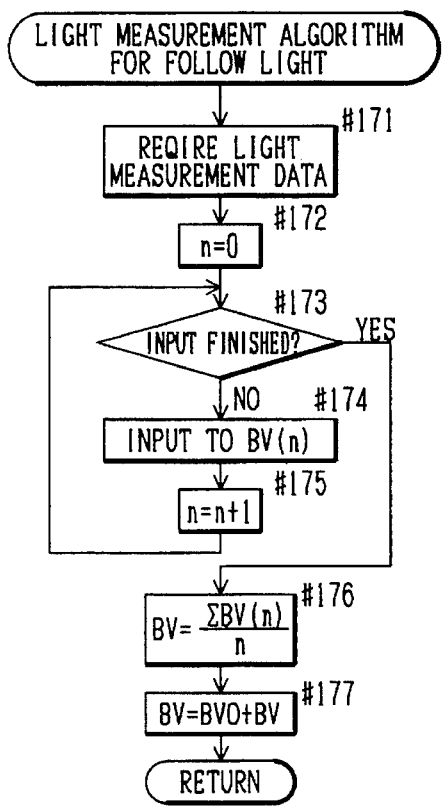
FIG. 21 is a flow chart showing a light measurement algorithm for follow light.

FIG. 21 shows the light measurement algorithm for follow light, processed at step #136. At step #171, the control microcomputer 21 demands that the light measurement circuit 22 output data on the light measurement devices within the area designated by the light processing. At steps

172–#175, the data sent from the light measurement circuit 22 is input to a variable BV (n). Here, n denotes data number. Upon the completion of input, the process proceeds to step #176 to obtain an average value of the input data. In the light measurement algorithm for follow light, an exposure value BV is determined from an average value of all the light measurement devices. Then, at step #177, the exposure amount BV obtained above is added to the standard exposure value BVO read from the film. The additive value obtained in this way is made an exposure value for printing, and the process returns.

Figure 22:
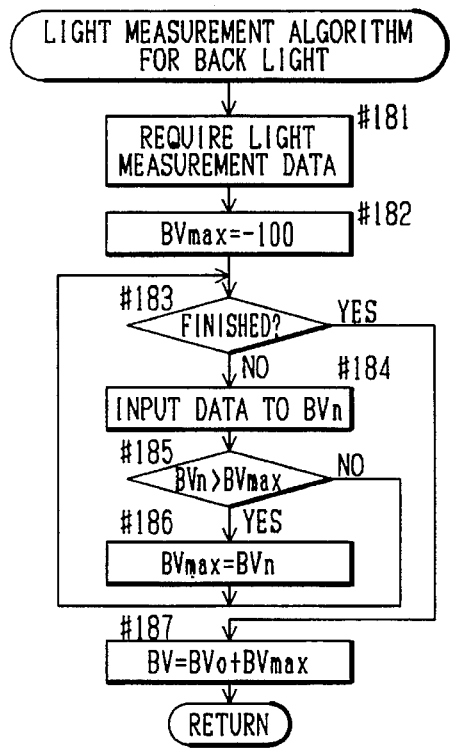
FIG. 22 is a flow chart showing a light measurement algorithm for back light.

FIG. 22 shows a light measurement algorithm for back light, processed at step #137. At step #181, the control microcomputer 21 demands that the light measurement circuit 22 output the light measurement data on the light measurement devices within the area designated by the light measurement processing. Then, at step #182. −100 is substituted into a variable BVmax which stores a maximum light measurement value. At steps #183–#186, the maximum value of the data sent from the light measurement circuit 22 is set in the variable BVmax. In the light measurement algorithm for back light, an exposure amount is determined based on a light measurement device which has shown the highest value of all the light devices. This is because of brightness and darkness reversal in the back light photographing; the main object, which existed originally in low brightness portions, occupies high brightness portions over the negative film after being photographed. Thereafter, at step #187, the variable BVmax obtained in this way is added to the standard exposure value BVO read from the film. This additive value is made an exposure value for printing, and the process returns.

Figure 23:
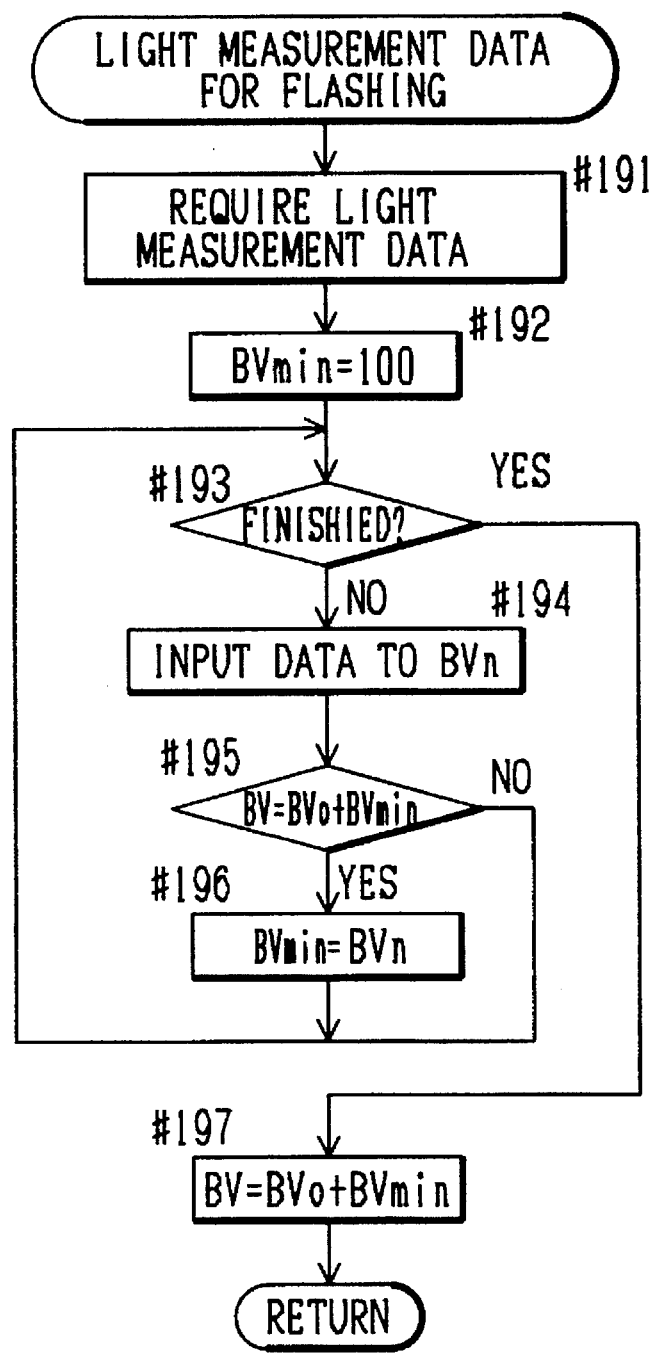
FIG. 23 is a flow chart showing a light measurement algorithm for flash light.

FIG. 23 shows a light measurement algorithm for flashing, processed at step #138. At step #191, the microcomputer 21 requires the light measurement data on the light measurement devices within the area designated by the light measurement processing to be output from the light measurement circuit 22. Then, at step #192, 100, the maximum value in this system, is substituted into a variable BVmax which stores a minimum light measurement value. At steps #193–#196, the minimum value of the data sent from the light measurement circuit 22 is set as BVmin. In the light measurement algorithm for flashing, an exposure amount is determined from a light measurement device which has shown the lowest value of all the light devices. This is because of brightness and darkness reversal in the flash photographing; the main object, which existed originally in high brightness portions as illuminated with flash light while its background is not illuminated, occupies low brightness portions over the negative film after being photographed. Thereafter, at step #197, the exposure amount BVmin obtained above is added to the standard exposure value BVO read from the film. This additive value is made an exposure value for printing, and the process returns.

The present invention is not restricted to the above-described embodiments, but various changes and modifications can be made within the spirit and scope of this invention. For instance, in the above embodiment, proposed is a printer for producing photographic prints from film, on the assumption that a user has selected photographic system as a means for visualizing a desired image. However, it may be possible to view an image recorded on the film through a display means for example, TV system, by using photoelectric conversion elements such as a CCD or the like. The light measurement method for determining exposure amount in the above print producing process is applicable also to such a case.

What is claimed is:

1. A camera having a plurality of light measuring modes, comprising:
   means for selecting one of the light measuring modes;
   means for determining whether a light measurement of exposed film during a photographic printing process will be necessary, in dependence upon the selected light measuring mode; and
   means for recording information on a film pertaining to the selected light measuring mode, said information indicating whether light measurement during a photographic printing process will be necessary.

2. A camera as claimed in claim 1, wherein said light measuring modes include a spot light measurement mode in which the brightness of a small area in an objective field is measured, and said determining means determines that another light measurement during a printing process is not necessary when the spot light measurement mode is selected.

3. A camera as claimed in claim 1, wherein said light measuring modes include an average light measurement mode in which the brightness of a large area in an objective field is measured, and said determining means determines that another light measurement during a printing process is necessary when the average light measurement mode is selected.

4. A camera having a plurality of light measuring modes, comprising:
   means for selecting one of the light measuring modes;
   means for determining whether exposure correction during a printing process is necessary, in dependence upon the selected light measuring mode; and
   means for recording information on a film that pertains to the result of said determination, wherein said information indicates the necessity or unnecessity of exposure correction during a printing process.

5. A camera as claimed in claim 4, wherein said light measuring mode include a spot light measurement mode in which the brightness of a small area in an objective field is measured, and said determining means determines that exposure correction during a printing process is not necessary when the spot light measurement mode is selected.

6. A camera as claimed in claim 4, wherein said light measuring modes include an average light measurement mode in which the brightness of a large area in an objective field is measured, and said determining means determines that exposure correction during a printing process is necessary when the average light measurement mode is selected.

7. A camera comprising:
   means for measuring the brightness of an objective field, wherein said measuring means has a plurality of light measuring modes;
   means for selecting one of the light measuring modes;
   means for recording information about a photographing condition on a film;
   means for determining whether exposure correction during a printing process will be necessary, in dependence upon the selected light measuring mode, wherein said exposure correction during a printing process is carried out on the basis of the recorded information about the photographing condition; and
   means for controlling said recording means so as to record information about the necessity or unnecessity of exposure correction on the film in accordance with the result of said determination.

8. A camera as claimed in claim 7, wherein said light measuring modes include a spot light measurement mode in which the brightness of a small area in an objective field is measured, and said determining means determines that exposure correction during a printing process is not necessary when the spot light measurement mode is selected.

9. A camera as claimed in claim 7, wherein said light measuring modes include an average light measurement mode in which the brightness of a large area in an objective field is measured, and said determining means determines that exposure correction during a printing process is necessary when the average light measurement mode is selected.

10. A camera as claimed in claim 7, wherein said recording means records information about the brightness of the objective field as measured by said measuring means, and said exposure correction during a printing process is carried out on the basis of the recorded information about the brightness of the objective field.

11. A photo-taking system composed of a camera and a printing apparatus, comprising:
   a camera having a plurality of light measuring modes including:
      means for selecting one of the light measuring modes;
      means for determining whether exposure correction during a printing process will be necessary in dependence upon the selected light measuring mode; and
      means for recording information on a film in accordance with the result of said determination, wherein said information indicates the necessity or unnecessity of exposure correction during a printing process; and
   a printing apparatus for producing a photo-print including:
      means for reading the information recorded by said recording means of the camera;
      means for correcting an exposure during a priming process; and
      means for controlling the correcting means so as to carry out the exposure correction when the information read by reading means indicates that the exposure correction is necessary.

12. A photo-taking system as claimed in claim 11, wherein said light measuring modes include a spot light measurement mode in which the brightness of a small area in an objective field is measured, and wherein said determining means of the camera determines that exposure correction during a printing process is not necessary and said controlling means of the printing apparatus controls the correcting means so as not to carry out exposure correction when the spot light measurement mode is selected.

13. A photo-taking system as claimed in claim 11, wherein said light measuring modes include an average light measurement mode in which the brightness of a large area in an objective field is measured, and wherein said determining means of the camera determines that exposure correction during a printing process is necessary and said controlling means of the printing apparatus controls the correcting means so as to carry out exposure correction when the average light measurement mode is selected.

* * * * *